S. D. YERKES.
Dairy House.
No. 53,516.
Patented March 27, 1866.
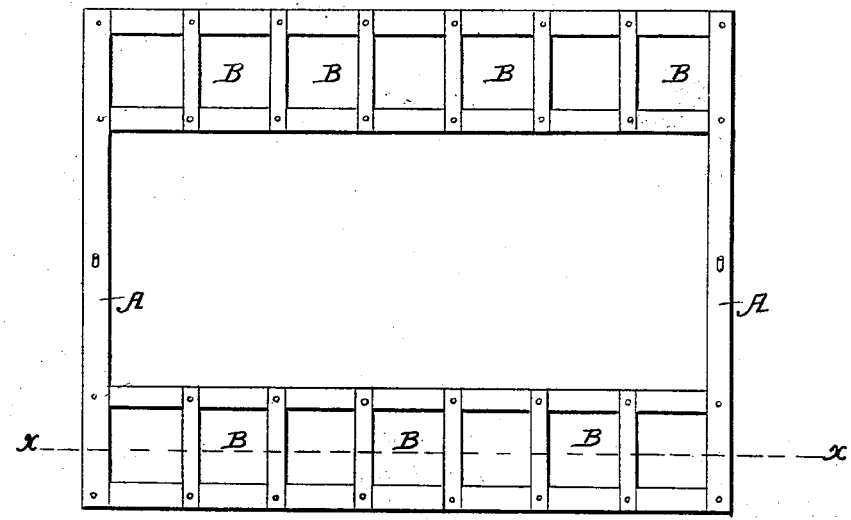
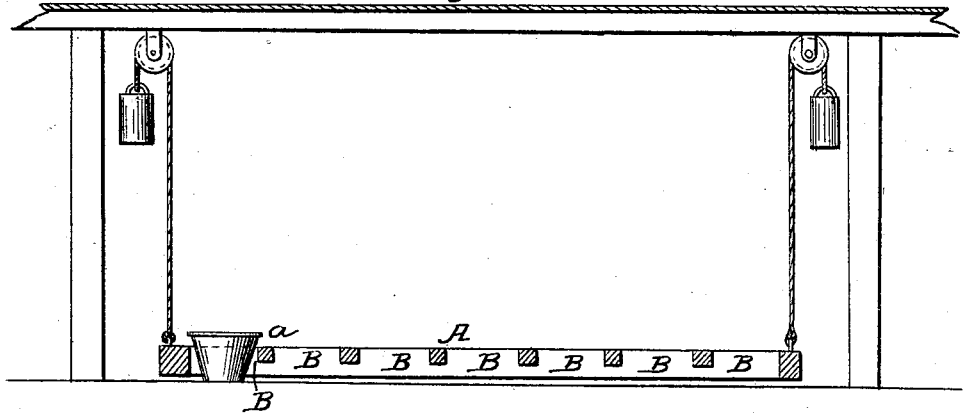
Witnesses:
Inventor:

UNITED STATES PATENT OFFICE.

SILAS D. YERKES, OF DOWNINGTON, PENNSYLVANIA.

IMPROVEMENT IN DAIRY-HOUSES.

Specification forming part of Letters Patent No. 53,516, dated March 27, 1866.

*To all whom it may concern:*

Be it known that I, SILAS D. YERKES, of Downington, in the county of Chester and State of Pennsylvania, have invented a new and useful Improvement in Dairy-Houses; and I do hereby declare that the following is a full, clear, and exact description thereof, which will enable others skilled in the art to make and use the same, reference being had to the accompanying drawings, forming a part of this specification.

The object of the present invention is to prevent the waste of milk and its cream by the flooding of the dairy-house; and it consists in providing a frame made of wood or other light and suitable material, which will float upon the water, of proper construction to receive and hold the pans containing the milk and cream, as will be hereinafter fully explained, reference being had to the accompanying plate of drawings, of which—

Figure 1 is a plan or top view of the frame, and Fig. 2 a section taken in the plane of the line $x\ x$, Fig. 1.

Similar letters of reference indicate like parts.

A in the drawings represents the frame, made of wood or other suitable light and buoyant material, the dimensions of which both in length and width are to correspond with the interior of the dairy-house, so that as it rises and falls within the same it will be guided by its sides, this frame being divided into a series of square-shaped openings or frames, B, for the reception of the cans C, one of which is shown in Fig. 2, in which the milk or cream is placed, said cans resting by the flange $a$ of their upper and open ends upon the said frame as it rises or lowers.

By this arrangement it is obvious that the washing or spilling of the milk or cream in the pans by the flooding of the dairy-house will be entirely prevented, as the rising or lifting of the frame A will necessarily carry with it the pans, the sides of the several holders for them keeping them from being upset.

To guide the frame in its movement up and down within the dairy-house, consequent upon the flooding of the same, it may be hung at each end by a weight and cord upon a pulley; but I do not deem it necessary if the frame is made sufficiently large to be guided by the sides of the dairy-house.

I claim as new and desire to secure by Letters Patent—

The frame A, provided with suitable openings or holders for cans or pans containing milk or cream, or both, and constructed and arranged substantially as described, for the purpose specified.

The above specification of my invention signed by me this 24th day of November, 1865.

SILAS D. YERKES.

Witnesses:
SAML. RINGWALT,
JOHN WALKER.